United States Patent [19]

Tamai

[11] Patent Number: 5,705,911
[45] Date of Patent: Jan. 6, 1998

[54] CHARGING CIRCUIT

[75] Inventor: Mikitaka Tamai, Sumoto, Japan

[73] Assignee: Sanyo Electric Co., Ltd., Osaka, Japan

[21] Appl. No.: 757,453

[22] Filed: Nov. 27, 1996

[30] Foreign Application Priority Data

Nov. 30, 1995 [JP] Japan .................. 7-311852

[51] Int. Cl.⁶ .................. H02J 7/10; H02H 7/18
[52] U.S. Cl. .................. 320/5; 320/13; 320/29; 320/30
[58] Field of Search .................. 320/5, 13, 14, 320/29, 30, 32, 39; 323/223

[56] References Cited

U.S. PATENT DOCUMENTS

| | | | |
|---|---|---|---|
| 5,304,915 | 4/1994 | Sanpei et al. | 320/14 |
| 5,477,130 | 12/1995 | Hashimoto et al. | 320/49 |
| 5,493,197 | 2/1996 | Eguchi et al. | 320/5 |
| 5,526,215 | 6/1996 | Higashijima et al. | 361/86 |
| 5,530,336 | 6/1996 | Eguchi et al. | 320/5 |
| 5,569,550 | 10/1996 | Garret et al. | 429/7 |
| 5,610,495 | 3/1997 | Yee et al. | 320/6 |

FOREIGN PATENT DOCUMENTS 5-49181  2/1993  Japan .

*Primary Examiner*—Peter S. Wong
*Assistant Examiner*—Patrick B. Law
*Attorney, Agent, or Firm*—Wenderoth, Lind & Ponack

[57] ABSTRACT

An over-charge protection FET and an over-discharge protection FET are connected in series with the rechargeable battery and turned ON or OFF by a control circuit. An ON-OFF switching device is connected between G and S of the over-charge protection FET and controlled by an output signal from the control circuit. An over-charge protection FET drain voltage input circuit is connected to the input side of the ON-OFF switching device. When the drain voltage of the over-charge protection FET is high, the input circuit sets the ON-OFF switching device to the ON state to forcibly set the over-charge protection FET to the OFF state.

21 Claims, 3 Drawing Sheets

CHARGING CIRCUIT

BACKGROUND OF THE INVENTION

The present invention relates to a charging circuit provided with a circuit to prevent excessive charge and excessive discharge of a rechargeable battery.

The FIG. 1 shows the charging circuit preventing the excessive charge and the excessive discharge of the rechargeable battery 1. This charging circuit connects in series the over-discharge protection FETE and the over-charge protection FET3. The charging circuit shown in the figure, makes the over-discharge protection FETE and the over-charge protection FET3 as a power MOSFET of the n-channel. The over-discharge protection FETE and the over-charge protection FET3 are connected to the control circuit 4. Furthermore, the over-charge protection FET3 is ON-OFF controled by the control circuit 4. The over-discharge protection FETE and the over-charge protection FET3 are connected in series and inverted. This is because when charging and when discharging the rechargeable battery 1 the electrical current flows in the opposite direction.

The over-discharge protection FETE is normally set in the ON state but when the voltage level of the rechargeable battery 1 is lower than the lowest preset voltage level, it is changed to the OFF state to prevent the excessive discharge of the rechargeable battery 1. When the voltage level of the rechargeable battery 1 is higher than the highest preset voltage level, the over-charge protection FET3 is changed to the OFF state to prevent excessive charge of the rechargeable battery 1. The control circuit 4, detects the voltage of the rechargeable battery 1 and controls the over-discharge protection FET2 and the over-charge protection FET3.

When the voltage level of the rechargeable battery 1 is lower than the lowest preset voltage level, the output terminal 41 is set as "Low" the control circuit 4 makes the over-discharge protection FET2, OFF. When the voltage level, of the rechargeable battery 1 is higher than lowest preset voltage level, the output terminal 41 is "High" and the over-discharge protection FETE is ON, allowing the discharge of the rechargeable battery 1.

Then, when the voltage of the rechargeable battery 1 is higher than the highest preset voltage level, the output terminal 42 is "High" and the control circuit 4 makes the ON-OFF switching device 5, ON. The ON-OFF switching device 5 of the output ON places in OFF state the gate of the over-charge protection FET3 as potential of the source. In this condition, charging of the rechargeable battery 1 is stopped. When the voltage of the rechargeable battery 1 is lower than the highest preset voltage level, the control circuit 4 sets the output terminal 42 at high impedance and the ON-OFF switching device 5 in the OFF state. The ON-OFF switching device 5 set in the OFF state, does not short circuit the gate of over-charge protection FET3. Therefore, the over-charge protection FET3 enters in ON state supplying a bias voltage to the gate through the bias resistor 8. In this condition, the rechargeable battery 1 enters in a condition where the charge is possible.

When the voltage of the rechargeable battery 1 is lower than the lowest preset voltage level, the charging circuit shown in FIG. 1, as above described, prevents the excessive discharge by stopping the discharge and when higher than the highest preset voltage level, prevents the excessive charge by stopping the charge.

But, when the rechargeable battery 1 has an inner short-circuit, the over-charge protection FET3 overheats, then this charging circuit shows troubles due to heat, as a weak point.

This is because, when in the hereunder described condition, the electrical current flows into the over-charge protection FET3.

①In the condition of an inner short-circuit in the rechargeable battery 1, when a charger (not illustrated) is connected to the +− of the terminal 11, the output voltage of the charger is supplied to the over-discharge protection FET2 and the over-charge protection FET3. This is because the voltage of the rechargeable battery 1 is 0V.

②Because the voltage of the rechargeable battery 1 is lower than the lowest preset voltage level, the terminal 41 output is "Low" and the control circuit 4 sets the over-discharge protection FET2, OFF.

③Because the voltage of the rechargeable battery 1 is lower than the highest preset voltage level, the terminal 42 output is at high impedance and the control circuit 4 sets the ON-OFF switching device 5 in OFF state.

④The ON-OFF switching device 5 in OFF state does not short circuit between G and S of the over-charge protection FET3. Therefore in the gate of the over-charge protection FET3, the voltage of the battery is added to the voltage between D and S of the over-discharge protection FET2 through the bias resistor 8. But, because the battery voltage is 0V, the voltage between D and S of the over-discharge protection FET2 is supplied. The voltage between D and S of the over-discharge protection FET2 becomes extremely low because of the reduction of the voltage of the parasitic diode. In other words, the voltage of the gate of the over-charge protection FET3 becomes remarkably small and the inner resistance becomes extremely large.

⑤The charging current of the rechargeable battery 1 flows in the over-charge protection FET3 with a large inner resistance. Therefore, the loss of the over-charge protection FET3 becomes extremely large and overhears, and shows troubles due to heat, as a weak point. This is because the loss of the over-charge protection FET3 is the product of the multiplication of the inner resistance and the charging current. With a rechargeable battery 1 with no inner short- circuit, the battery with a normal voltage, because it supplied a sufficient voltage to the gate of the over-charge protection FET3 through the bias resistor 8, the over-charge protection FET3 enters in ON state with low resistance. Because the loss of the over-charge protection FET3 is the product of the multiplication of the inner resistance and the current, when inner resistance is low, the loss is small, and the over-charge protection FET3 does not on heat.

As described above, one purpose of the development of the present invention is prevent the over-heat of the over-charge protection FET when by error a rechargeable battery 1 with an inner short-circuit, is charged. Furthermore, the second purpose of the present invention is to propose a charging circuit that can charge a rechargeable battery showing an extremely low battery voltage with no short-circuit.

The above and further objects and features of the invention will more fully be apparent from the following detailed description with accompanying drawings.

SUMMARY OF THE INVENTION

The charging circuit of the present invention connects the over-charge protection FET3 protecting from excessive charge and the over-discharge protection FET2 preventing the excessive discharge in series with the rechargeable battery. These over-charge protection FET3 and the over-discharge protection FET2 are ON-OFF controlled by the control circuit that detects the voltage of the rechargeable battery. Furthermore, the ON-OFF switching device controlled ON-OFF by the output signal of the control circuit, is connected between G and S of the over-charge protection FET3.

In this charging circuit, when the voltage of the rechargeable battery is lower than the highest preset voltage level, the control circuit changes the ON-OFF switching device to the OFF state, and makes a high impedance condition between G and S of the over-charge protection FET3. The ON-OFF switching device of high impedance does not provoke any short-circuit between G and S of the over-charge protection FET3, makes the over-charge protection FET3 in ON state and makes possible the charging of the rechargeable battery.

Furthermore the charging circuit of the present invention, connects the input circuit of the drain voltage of the over-charge protection FET3 to the input side of the ON-OFF switching device. The most simple input circuit is the diode shown in FIG. 2. When the drain voltage is high and the inner resistance of the over-charge protection FET3 is high, the diode that is the input circuit, changes the ON-OFF switching device to the ON state. This is because the input circuit inputs a bias to the ON-OFF switching device. The ON-OFF switching device in the ON state, forcibly makes the over-charge protection FET3 in OFF state, and the charging of the rechargeable battery is stopped. For this reason, when charging a rechargeable battery that has an inner short-circuit, the over-charge protection FET3 is kept in OFF state. There is no risk of heat of the over-charge protection FET3 in OFF state.

Furthermore, the desirable charging circuit of the present invention, connects the gate of the over-charge protection FET3 connected to the ON-OFF switching device, to the rechargeable battery through the resistance, and the capacitor delaying the rise of the gate voltage. The capacitor delays temporarily the ON-OFF switching device from becoming ON and until the time the ON-OFF switching device enters in ON state, the over-charge protection FET3 being ON, the rechargeable battery is charged. When a rechargeable battery that has no inner short circuit, even if the battery voltage is extremely low, is charging, the voltage rises. Even if a rechargeable battery that has an inner short-circuit, is charged, the battery voltage does not rise. For that reason, when the ON-OFF switching device delayed by the capacitor 10 becomes ON, the over-charge protection FET3 is changed to the OFF state. When charging for a determined time, the rechargeable battery which battery voltage is rising, being delayed by the capacitor, even if the ON-OFF switching device is trying to become ON, the ON state will not be realized. This is because the bias voltage is not input from the diode that is the input circuit, to the ON-OFF switching device. Therefore by delaying temporarily, through the capacitor, the entering into the ON state of the ON-OFF switching device, the battery voltage being extremely low, a rechargeable battery that has no inner short-circuit can normally charged.

The charging circuit of which the switching to the ON state of the ON-OFF switching device is temporarily delayed by the capacitor, when charging a rechargeable battery with an inner short-circuit, until the time the ON-OFF switching device becomes ON, the inner resistance of the over-charge protection FET3 becomes larger and the loss becomes also larger. However, the over-charge protection FET3 can be designed not to be subject to heat trouble, only during the time of the delay of the capacitor, because the inner loss becomes larger only for a short time.

DETAILED DESCRIPTION OF THE INVENTION

The charging circuit of a lithium ion rechargeable battery is hereunder described. However, the charging circuit of the present invention by changing the preset voltage, can be used in the charging circuit of a battery other than a lithium ion rechargeable battery, for example, a nickel-cadmium battery or a nickel-hydrogen battery.

Figure 1:
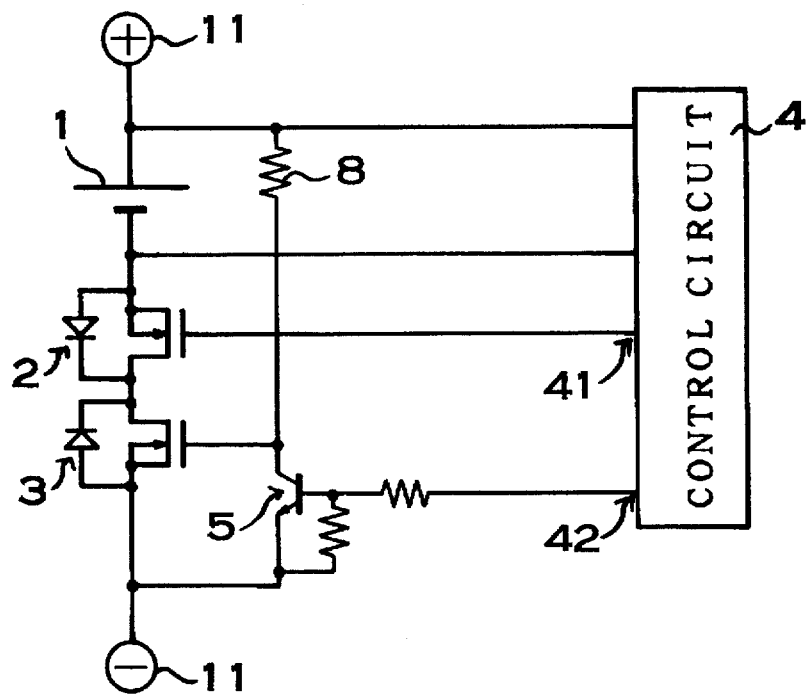
FIG. 1 is a diagram of a prior art charging circuit which prevents excessive charge and discharge of a rechargeable battery by an over-charge protection FET and an over-discharge protection FET.
Figure 2:
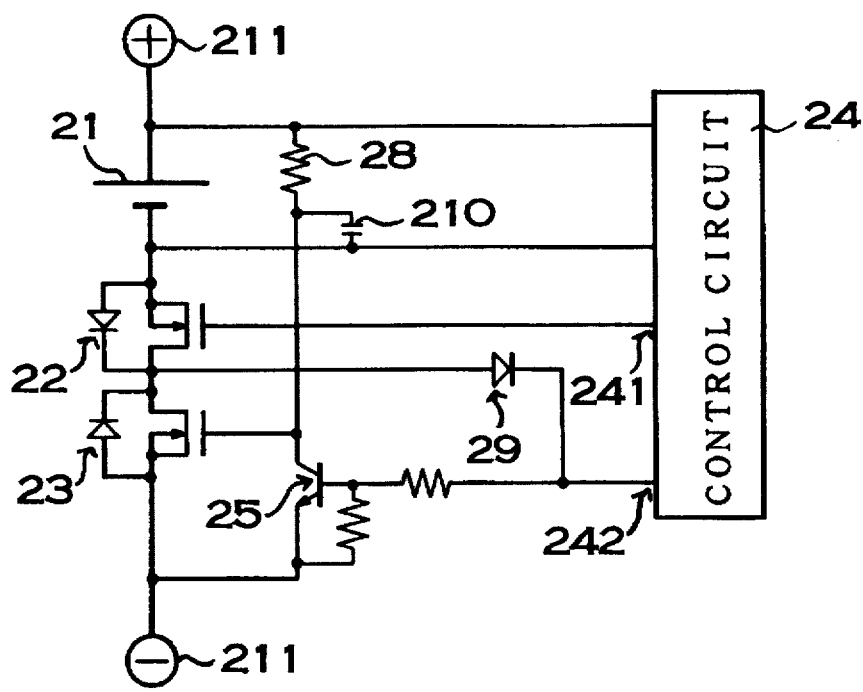
FIG. 2 is a diagram of the charging circuit embodiment of the present invention.

The charging circuit shown in FIG. 2, is installed in a battery pack as protection circuit. This charging circuit connecting in series the rechargeable battery 21, the over-discharge protection FET22 discharge and the over-charge protection FET23, and is connected at the +− of terminals 211 of the battery pack. The over-discharge protection FET22 and the over-charge protection FET23 are connected reversely by the n-channel power MOSFET. The current flows in the opposite direction of the power MOSFET of the over-discharge protection FET22 and the over-charge protection FET23 because the parasitic diode is connected in parallel.

The over-discharge protection FET22 and the over-charge protection FET23 are controlled by the control circuit 24. The control circuit 24 detects the battery voltage and controls the over-discharge protection FET22 and the over-charge protection FET23. The control circuit 24 changes the over-discharge protection FET22 to OFF when the battery voltage is lower than the lowest preset voltage level and the lithium ion rechargeable battery 21 is under 2.30V. When the battery voltage is superior to this voltage value, the control circuit 24 sets the over-discharge protection FET22 in the ON state and the rechargeable battery 21 can be discharged. The control circuit 24 changes the over-discharge protection FET22 to OFF when the output terminal 241 is "Low" and the over-charge protection FET23 to ON when "High". Therefore the output terminal 241 of the control circuit 24 is connected to the gate of the over-discharge protection FET22.

Furthermore, the control circuit 24 controls the over-charge protection FET23 through the ON-OFF switching device 25. The control circuit 24 incorporates the output terminal 242 to change ON or OFF the ON-OFF switching devise 25, the output terminal 242 is connected to the base of the bipolar transistor that is the ON-OFF switching device 25. When the voltage of the rechargeable battery 21 is higher than the highest preset voltage level, higher than 4.25V in case of a lithium ion rechargeable battery the control circuit 24 makes the output "High", changes the ON-OFF switching device 25 to ON and the over-charge protection FET23 to the OFF state. If the voltage of the rechargeable battery 21 drops under 4.1V, the output terminal of the control circuit 24 is at high impedance, and the gate of the ON-OFF switching device 25 is in the OPEN state. When the output terminal 242 is at high impedance and the ON-OFF switching device 25 in the OPEN state, the ON-OFF switching device 25 is OFF as long as the bias voltage is not input. The ON-OFF switching device 25 in OFF state, does not put the over-charge protection FET23 forcibly in OFF state, but keeps the over-charge protection FET23 in ON state.

Figure 3:
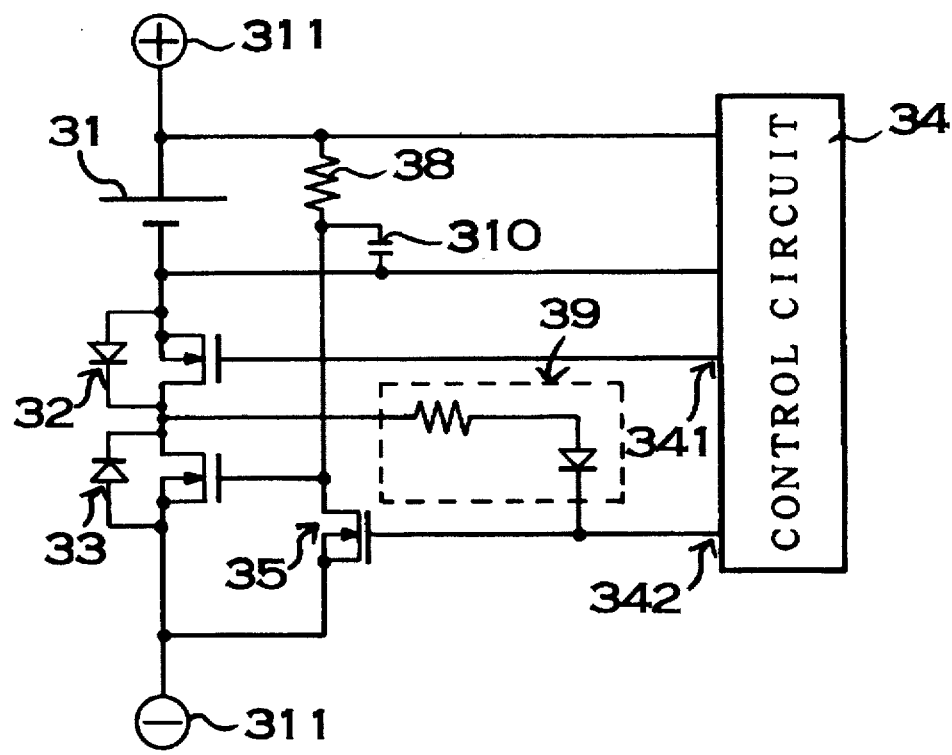
FIG. 3 is a diagram of another charging circuit embodiment of the present invention.

The ON-OFF switching device 25 connected to the output terminal 242 of the control circuit 24 makes a short-circuit or leaves open between G and S of the over-charge protection FET3. When the ON-OFF switching device 25 makes a short-circuit between G and S of the over-charge protection FET23, the over-charge protection FET23 is forcibly controlled in the OFF state. The ON-OFF switching device 25 shown in the figure is an bipolar transistor. The ON-OFF switching device 25 of the bipolar transistor connects the collector to the gate of the over-charge protection FET23 and the emitter to the source. But as described in the FIG. 3, a FET is used instead of an bipolar transistor inside the ON-OFF switching device 35. The ON-OFF switching devise 35 that is a FET, connects the drain to the gate of the over-charge protection FET33 and the source to the source of the over-charge protection FET33.

Figure 4:
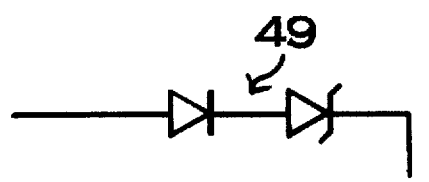
FIG. 4 is a diagram of a circuit showing a real example of the input circuit of the present invention.
Figure 4:
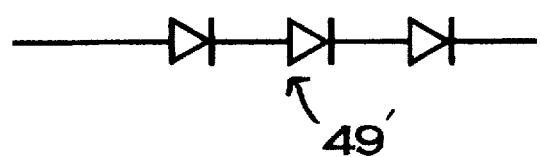

The connecting point of the over-discharge protection FET22 and the over-discharge protection FET23 is connected to the input side of the ON-OFF switching device 25 through the input circuit 29. The input circuit 29 is a circuit in which the high voltage, that is to say, the inner resistance being large, inputing the drain voltage of the over-charge protection FET23 with a high drain and source voltage to the input side of the ON-OFF switching device 25 is a circuit that forcibly changes the ON-OFF switching device 25 to ON. The input circuit 29 described in the figure is a diode. The input circuit 29, when the voltage is higher than preset, becomes ON, the current dose not flow in the opposite direction, all the devices and circuits can be used. For example, instead of a diode, as shown in FIG. 4, it is possible to conceive a circuit connecting in series the diode and the zener diode or a circuit connecting a plurality of diodes in series.

Figure 5:
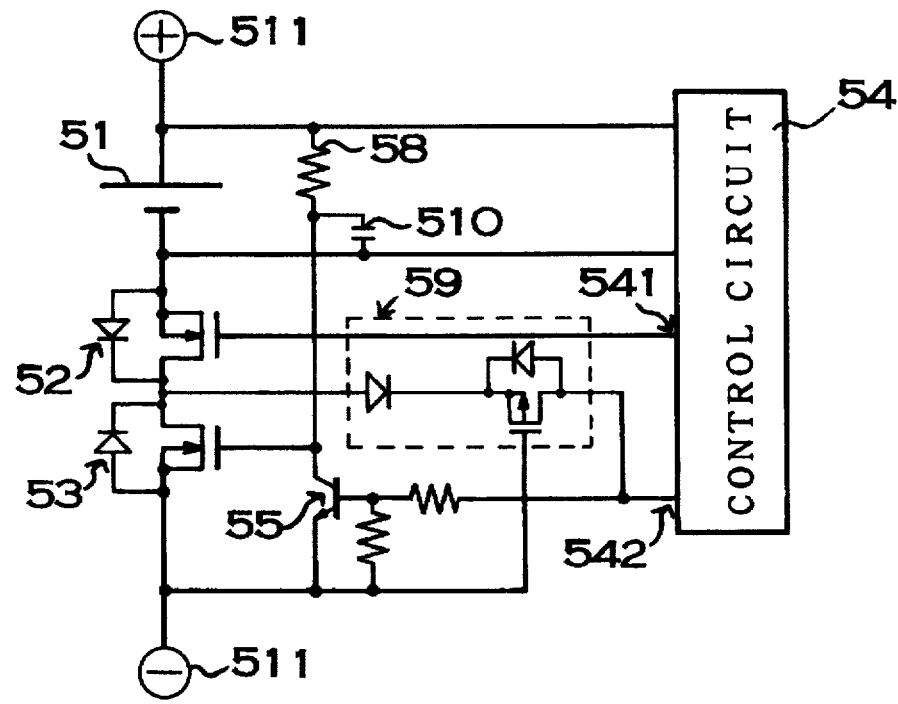
FIG. 5 is a diagram of another charging circuit embodiment of the present invention.
Figure 6:
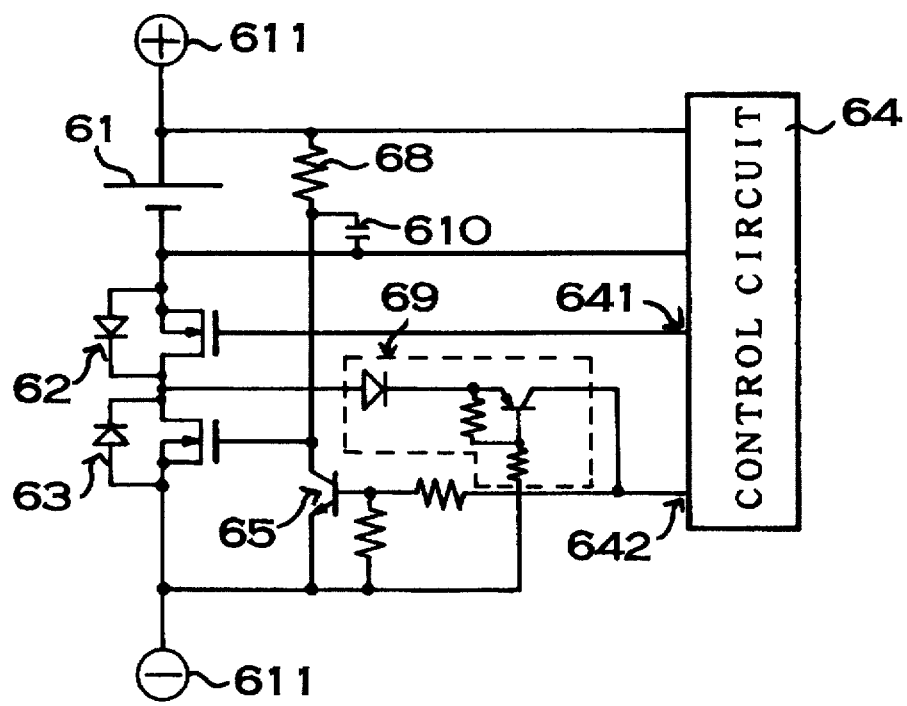
FIG. 6 is a diagram of another charging circuit embodiment of the present invention.

Furthermore, in the input circuit, it is possible to combine a diode and a FET or a diode and an bipolar transistor, as shown in the FIG. 5 and FIG. 6. When the drain voltage of the FET 53, 63 over-charging prevention is high, and the FET or the bipolar transistor of the input circuit 59, 69 being in ON state, the bias voltage being input to the ON-OFF switching device 55, 65, the input circuit 59, 69, as shown in FIG. 5 and FIG. 6, changes to ON.

The charging circuit of the FIG. 2 functions as follows to charge a rechargeable battery.

[When discharging a normal rechargeable battery]

① When the Voltage of the rechargeable battery 21 is higher than the lowest preset voltage level, the control circuit 24 detects the battery voltage and sets the output terminal 241 at "High"

② When "High" is input to the gate of the over-discharge protection FET22, the over-discharge protection FET22 becomes ON. In this condition, the rechargeable battery 21 is normally discharged.

[When charging a normal rechargeable battery]

① When the voltage of the rechargeable battery 21 is lower than the highest preset voltage level, the control circuit 24 detects the battery voltage and sets the output terminal 242 at high impedance.

② Because the output terminal 242 is at high impedance, the ON-OFF switching device 28 becomes OFF.

③ The ON-OFF switching device 25 in OFF state, does not short-circuit between G and S of the over-charge protection FET23. Through the bias resistor 28, the bias voltage is input from the battery to the gate and the over-charge protection FET23 changes to the ON state. In this condition, the rechargeable battery 21 connects the charger to the +− of the terminals 211 and is charging.

④ When the rechargeable battery 21 is charged and the battery voltage higher than the highest preset voltage level, the control circuit 24 sets the output terminal 242 to "High" and changes the ON-OFF switching device 25 to the ON state.

⑤ The ON-OFF switching device 25 in ON state, short-circuiting between G and S of the over-charge protection FET23, sets the over-charge protection FET23 in the OFF state. Therefore, when this condition is set, even if the charger is connected to +− of the terminal 211, the rechargeable battery 21 is not more charged.

⑥ Then, the rechargeable battery 21 is discharged and the battery voltage becoming lower than highest preset battery level, the control circuit 24 sets the output of the output terminal 242 from "High" to high impedance, and changes the ON-OFF switching device 25 to OFF and the over-charge protection FET23 to ON. The preset voltage charging the over-charge protection FET23 in the condition OFF to the ON state, lowering a little under the highest preset voltage level, produces an histeresis.

[When a charger is connected to +− of the terminal of a rechargeable battery with an internal short-circuit]

① Because the voltage of the rechargeable battery 21 is lower than the lowest preset voltage level, the control circuit 24 sets the output terminal 241 at "Low" and makes the over-discharge protection FET22, OFF. But, in the over-discharge protection FET22, because the parasitic diode is connected in parallel, the charging current crosses this parasitic diode and flows.

② Because the battery voltage is low, the control circuit 24 sets the output terminal 242 at high impedance and the ON-OFF switching device 25 in the OFF state.

③ The charging current of a charger connected to +− of the terminal 211 flows according to the hereunder described routing. + of the terminal 211→the short-circuited rechargeable battery 21→the parasitic diode of the over-discharge protection FET22 →the over-charge protection FET23→− of the terminal 211.

④ The ON-OFF switching device 25 being in OFF state but because the battery voltage of the short-circuited rechargeable battery 21 is almost 0V, there is not enough bias voltage input into the gate of the over-charge protection FET23, then the over-charge protection FET23 in the state of high resistance. The output voltage of the charger is added to the rechargeable battery 21, to the parasitic diode and to the over-charge protection FET23 but, because the rechargeable battery 21 is 0V and the parasitic diode as low as under 1V, the output voltage of the charger is almost added into the over-charge protection FET23.

⑤ According to the high voltage supplied into the drain of the over-charge protection FET23, the diode of the input circuit 29 is biased in the order of the routing. The electrical current flowing in the diode of the input circuit 29, is supplied to the base of the bipolar transistor of the ON-OFF switching device 25, changing the ON-OFF switching device 25 to ON.

⑥ The ON-OFF switching device 25 that became ON, short-circuits between G and S and forcibly sets the over-charge protection FET23 in OFF state. Therefore, in this condition the over-charge protection FET23 being in the condition of high resistance, the charging current does not flow and there is no production of heat. Furthermore, the over-charge protection FET23 that became OFF, because the drain voltage is high, makes the bias in the order of the routing of the diode that is the input circuit 29, sets the ON-OFF switching device 25 in ON state, and maintain the over-charge protection FET23 in OFF state by the ON-OFF switching device 25.

Therefore when charging a rechargeable battery 21 that has an inner short-circuit, the over-charge protection FET23 becomes OFF and the charging is stopped.

[When charging a rechargeable battery that is not short-circuited but which voltage is extremely low]

① Because the voltage of the rechargeable battery 21 is lower than the lowest preset voltage level, the control circuit 24 sets the output terminal 241 as "Low" and the over-discharge protection FET22 OFF. But in the over-discharge protection FET22, because the parasitic diode is connected in parallel the charging current flows through the parasitic diode.

② Because the voltage of the battery is low, the control circuit 24 sets the output terminal 242 at high impedance, and the ON-OFF switching device 25 in OFF state.

③ The charging current of a charger connected to +– of the terminals 211 flows according to the hereunder described routing. + of the terminal 211→the short-circuited rechargeable battery 21→the parasitic diode of the over-discharge protection FET22→the over-charge protection FET23→– of the terminal 211.

④ The ON-OFF switching device 25 being in OFF state but because the battery voltage is almost 0V, there is not enough bias voltage input into the gate of the over-charge protection FET23, then the over-charge protection FET23 is in the condition of high resistance. The output voltage of the charge is added to the rechargeable battery 21, to the parasitic diode and to the over-charge protection FET23, but, because the rechargeable battery 21 is almost 0V and the parasitic diode as low as under 1V, the output voltage of the charger is almost added to the FET23 over-charging prevention.

⑤ According to the high voltage added into the drain of the over-charge protection FET23, the diode of the input circuit 29 is biased in the order of the routing. The electrical current flowing in the diode of the input circuit 29, is supplied to the base of the bipolar transistor of the ON-OFF switching device 25 but, the bipolar transistor of the ON-OFF switching device 25 does not become immediately ON. This is because the capacitor 210 is connected to the collector and because the rise of the collector voltage is delayed until the capacitor 210 is charged. Therefore, the bias voltage is supplied to the base, but because the collector voltage is low, the ON-OFF switching device 25 needs time to become ON.

The time needed to rise the voltage of both terminals of the capacitor 210, in other words, the time needed to rise the electric potential of the collector of the bipolar transistor that is the ON-OFF switching device 25, is decided according to the value of the bias resistor 28 and the product of the static electricity capacity of the capacitor 210. When the resistance value of the bias resistor 28 is large and the static electricity capacity of the capacitor 210 is made larger, the rise of the capacitor 210 voltage is delayed, and the time when the bipolar transistor that is the ON-OFF switching device 25, becomes ON, is delayed. Until the ON-OFF switching device 25 becomes ON, that is to say, when the ON-OFF switching device 25 is in the OFF state, the over-charge protection FET23 enters in the condition of high resistance. For this reason, the time needed by the ON-OFF switching device 25 to change from OFF to ON, is fixed to be shorter than the time needed by the over-charge protection FET23 of high resistance to be altered by heat. But at the moment the ON-OFF switching device 25 become ON, if the voltage of the rechargeable battery 21 were not becoming high, the inner resistance of the over-charge protection FET23 gets larger and produces heat. Therefore, the time needed by the ON-OFF switching device 25 to change from OFF to ON, the rechargeable battery 21 being charged, is fixed so that the battery voltage becomes large enough.

⑥ When the ON-OFF switching device 25 is maintained in OFF state, and the rechargeable battery 21 is charged with the over-charge protection FET23 not becoming OFF for a certain time, the voltage of the rechargeable battery 21 rises.

⑦ When the voltage of the rechargeable battery 21 rises, the input circuit 29 that is the diode, is reverse biased. For this reason, the current stops flowing in the base of the bipolar transistor that is the ON-OFF switching device 25. Therefore, the ON-OFF switching device 25 does not change to the ON state and the OFF state is maintained.

⑧ With the ON-OFF switching device 25 maintained in the OFF state, when the battery voltage of the rechargeable battery 21 rises, the normal bias voltage is added through the bias resistor 28, in the over-charge protection FET23. Therefore, the over-charge protection FET23 is in the ON state leading to a low resistance condition. In this condition the over-charge protection FET23 does not produce any heat and being in the ON state, the rechargeable battery 21 is charged. The over-charge protection FET23 does over-heat because the proper bias voltage is added. The over-charge protection FET23 of low resistance maintaining the diode that is the input circuit 29 in the reverse bias condition, maintain the ON-OFF switching device 25 in the OFF state.

⑨ In this condition, the charge of the rechargeable battery 21 progresses, the voltage of the rechargeable battery 21 rises to the highest preset voltage level and, the control circuit 24 makes the output of the terminal 242 "High", the ON-OFF switching device 25 changes from the OFF state to the ON state, the ON-OFF switching device 25 makes a short-circuit between G and S of the over-charge protection FET23, the over-charge protection FET23 becomes OFF and the charge is over.

As this invention may be embodied in several forms without departing from the sprit of essential characteristics thereof, the present embodiment is therefore illustrative and not restrictive, since the scope of the invention is defined by the appended claims rather than by the description preceding them, and all changes that fall within meets and bound of the claims, or equivalence of such meets and bounds thereof are therefore intended to be embraced by the claims.

What is claimed is:

1. A charging circuit for charging a rechargeable battery comprising:
    (1) an over-charge protection FET having a gate and a source, connected in series with the rechargeable battery, to protect the rechargeable battery from excessive charge;
    (2) an over-discharge protection FET connected in series with the rechargeable battery and the over-charge protection FET, to protect the rechargeable battery from excessive discharge;
    (3) a control circuit to prevent excessive charge and discharge of the rechargeable battery by detecting rechargeable battery voltage and controlling the ON-OFF state of the over-charge protection FET and the over-discharge protection FET;

(4) an ON-OFF switching device having an input side, connected between the gate and the source of the over-charge protection FET and controlled by an output signal from the control circuit; and (5) a drain voltage input circuit connected to the input side of the ON-OFF switching device, which switches the ON-OFF switching device to the ON state when the drain voltage of the over-charge protection FET is high to forcibly maintain the over-charge protection FET in the OFF state.

2. A charging circuit as recited in claim 1 wherein the ON-OFF switching device is a bipolar transistor.

3. A charging circuit as recited in claim 1 wherein the over-charge protection FET is connected to the negative side of the rechargeable battery through the over-discharge protection FET.

4. A charging circuit as recited in claim 1 wherein the input circuit is provided with a diode.

5. A charging circuit as recited in claim 4 wherein the input circuit is a series connection of a diode and a zener diode.

6. A charging circuit as recited in claim 4 wherein the input circuit is a series connection of a plurality of diode.

7. A charging circuit as recited in claim 4 wherein the input circuit is a series connection of a diode and a bipolar transistor.

8. A charging circuit as recited in claim 4 wherein the input circuit is a series connection of a diode and an FET.

9. A charging circuit as recited in claim 4 wherein the input circuit, which is a diode, is connected between the input side of the ON-OFF switching device and the drain of the over-charge protection FET.

10. A charging circuit as recited in claim 9 wherein the input circuit, which is a diode, is connected between the base of a bipolar transistor, which is the ON-OFF switching device, and the drain of the over-charge protection FET.

11. A charging circuit for charging a rechargeable battery comprising:

(1) an over-charge protection FET having a gate and a source, connected in series with the rechargeable battery, to protect the rechargeable battery from excessive charge;

(2) an over-discharge protection FET connected in series with the rechargeable battery and the over-charge protection FET, to protect the rechargeable battery from excessive discharge;

(3) a control circuit to prevent excessive charge and discharge of the rechargeable battery by detecting rechargeable battery voltage and controlling the ON-OFF state of the over-charge protection FET and the over-discharge protection PET;

(4) an ON-OFF switching device having an input side, connected, between the gate and the source of the over-charge protection FET and controlled by an output signal from the control circuit; and (5) a drain voltage input circuit connected to the input side of the ON-OFF switching device, which switches the ON-OFF switching device to the ON state when the drain voltage of the over-charge protection FET is high to forcibly maintain the over-charge protection PET in the OFF state, (6) a resistor connecting the gate of the over-charge protection FET to the rechargeable battery;

(7) a capacitor connected to said resistor and the gate of the over-charge protection FET to delay gate voltage rise in the over-charge protection FET; and wherein (8) the charging circuit is designed such that when rechargeable battery voltage is abnormally low, the capacitor delays the rise in gate voltage of the over-charge protection FET, the ON-OFF switching device is prevented from turning ON before the gate voltage rises, and the over-charge protection FET is kept in the ON state to allow charging of a rechargeable battery with low battery voltage but no internal short-circuit.

12. A charging circuit as recited in claim 11 wherein the ON-OFF switching device is a bipolar transistor of with its collector connected to the gate of the over-charge protection FET.

13. A charging circuit as recited in claim 12 wherein the capacitor is connected between the positive side of the rechargeable battery and the collector of the bipolar transistor, which is the ON-OFF switching device, and the resistor is connected between the positive side of the rechargeable battery and the collector of the transistor.

14. A charging circuit as recited in claim 11 wherein the over-charge protection FET is connected to the negative side of the rechargeable battery through the over-discharge protection FET.

15. A charging circuit as recited in claim 11 wherein the input circuit is provided with a diode.

16. A charging circuit as recited in claim 15 wherein the input circuit is a series connection of a diode and a zener diode.

17. A charging circuit as recited in claim 15 wherein the input circuit is a series connection of a plurality of diodes.

18. A charging circuit as recited in claim 15 wherein the input circuit is a series connection of a diode and a bipolar transistor.

19. A charging circuit as recited in claim 15 wherein the input circuit is a series connection of a diode and an FET.

20. A charging circuit as recited in claim 15 wherein the input circuit, which is a diode, is connected between the input side of the ON-OFF switching device and the drain of the over-charge protection FET.

21. A charging circuit as recited in claim 20 wherein the input circuit, which is a diode, is connected between the base of a bipolar transistor, which is the ON-OFF switching device, and the drain of the over-charge protection FET.

* * * * *